United States Patent Office 3,062,908
Patented Nov. 6, 1962

3,062,908
STORAGE BATTERY ELECTRODES AND METHODS FOR MAKING THEM
Alvin J. Salkind, Trenton, N.J., assignor to The Electric Storage Battery Company, a corporation of New Jersey
No Drawing. Filed Dec. 21, 1959, Ser. No. 860,684
8 Claims. (Cl. 136—24)

The present invention generally relates to negative electrodes for batteries of the nickel-cadmium type. More specifically, the present invention is concerned with a new and improved method for manufacturing cadium electrodes.

A general object of the present invention is to provide a method of manufacturing a cadmium electrode characterized by simplicity and economy.

There are three types of cadmium electrodes in common use today, the pocket, the pasted, and the sintered plaque types. Of these three, the latter can be distinguished from the others by virtue of its ability to be discharged at extremely high rates and its excellent cold temperature characteristics. The present invention is concerned with this third type, the impregnated sintered plaque cadmium electrode.

While conventional sintered plaque type cadmium electrodes have many desirable performance characteristics, they are, however, more costly than the other types of cadmium electrodes mentioned above. The reason for the high cost of this type of electrode is the multi-step process required for their manufacture. Conventionally such electrodes are manufactured by shaping and sintering finely divided nickel powder in a protective atmosphere to produce a porous conductive plaque of sintered nickel. The sintered plaque is then impregnated with a solution of a cadmium salt, preferably cadmium nitrate. Following the impregnation, the cadmium nitrate is electrochemically converted to cadmium in a suitable electrolyte. The plaque is then washed and dried. This cycle of impregnation, electrolysis, washing and drying is then repeated four or five times, each succeeding cycle making the washing more difficult.

It is an object of the present invention to provide a new and improved process for producing sintered plaque type cadmium electrodes which reduce the number of steps required for their production.

It is a further object of the present invention to provide a method for producing sintered type cadmium electrodes which does not require the impregnation of the sintered plaque with the active material and the production steps associated therewith.

It is another object of the present invention to provide a method for producing sintered plaque type cadmium electrodes which are characterized by their extreme thinness.

In accordance with the present invention, finely divided nickel or other sinterable metal inert in alkaline electrolytes is intimately mixed with cadmium oxide in specific proportions and the mixture shaped to form a plaque. The shaped plaque is then sintered in a nitrogen atmosphere or other inert gas, to structurize the nickel particles in the plaque by sintering. The sintered plaque produced may be electrochemically formed to provide a cadmium electrode ready for use. In the preferred form of the present invention, a temporary thermoplastic resin binder is utilized to facilitate the shaping and temporary structurization of the ingredients prior to sintering.

Other objects and advantages of the present invention will be readily apparent from the following detailed descriptions of preferred embodiments thereof.

In accordance with the preferred method of carrying out the present invention I utilize and improve on the method of producing battery electrodes disclosed in the pending application of J. C. Duddy, Serial No. 744,542, filed June 25, 1958, now abandoned and assigned to the assignee of this application. In this application, there is disclosed a method for producing structurized battery electrodes which comprises the steps of intimately mixing powdered metallic compounds and a thermoplastic resin to produce a plasticized mass, shaping said mass, and burning from said shaped mass the thermoplastic resin to produce a structurized battery electrode. As disclosed in that application, the process is also suitable for producing sintered nickel plaques adapted for subsequent impregnation with active material to produce sintered type electrodes for nickel cadmium batteries. With respect to the present invention, I enlarge upon this teaching and provide a method adapted to produce sintered plaque type cadmium electrodes which do not require the additional step of impregnation with active material.

In carrying out one form of the present invention, one part by weight of a thermoplastic resin such as polyethylene is plasticized at an elevated temperature in a mixing device such as a conventional two roll rubber mill. A temperature of approximately 250° F. has been found suitable for plasticizing this specific resin. After the plasticizing has been completed, there is supplied to the mixing device 6.85 parts by weight of finely divided metallic nickel and 3.43 parts by weight of finely divided cadmium oxide. After a time interval adequate for the intimate and homogenous mixing of the cadmium oxide and the plasticized thermoplastic resin, the mass of the intimately mixed material may be progressively withdrawn from the mill. Those skilled in the art will understand how to select the time required for plasticizing the thermoplastic resin and also the time required to produce the intimate mixing described above. For polyethylene, a time in the order of from about two to three minutes has been found sufficient for the plasticizing step and a time in the order of seven minutes has been found satisfactory for the thorough mixing of the nickel and cadmium oxide into the plasticized resins. It should be noted that the powdered nickel and powdered cadmium oxide may be pre-mixed before addition to the resin or the mixing may be accomplished on the mill.

When the plasticized mass of resin, nickel and cadmium oxide is removed from the mill, it may be shaped as by calendering or extruding to produce the desired electrode configuration. In this respect, it has been found practical to produce flat plate electrodes as thin as two mils by calendering the plasticized mass between rollers operated at a temperature of about 230° F. This temperature has been found particularly satisfactory for calendering polyethylene, however, it should be understood that with other types of thermoplastic resins the calendering temperatures may be selected by reference to tables of their physical properties.

If it is desired to produce flat plate type electrodes, the sheet material produced by the calendering operation may be pressed into a suitable grid which for cadmium electrodes is preferably an expanded nickel sheet or a nickel screen. The addition of a grid may be accomplished by pressing one or more sheets of calendered material and a suitable grid between platens operated at a temperature of from about 250° F. to about 300° F. to soften the thermoplastic resin. A pressure on the order of 2000 pounds per square inch has been found adequate for this purpose. While the addition of a grid to the plastic material may be carried out in the manner described above, it should be also understood that if the shaping can be accomplished by means of an extruder, that the material may be extruded directly on a suitable grid in a one-step operation.

Following the shaping or pressing operation, the thermoplastic resin may be burned from the structurized mass in a suitable furnace maintained at a temperature of approximately 570° F. Two or three minutes have been found adequate for the removal by burning of the thermoplastic resin. Following the removal of the resin from the shaped structurized mass, the atmosphere in the furnace is replaced with a nitrogen atmosphere and the temperature raised to 1300° F. to sinter the nickel particles. The sintering of the nickel particles can be accomplished in approximately one-half hour at the temperature specified. It should be noted that it has been found that cadmium oxide does not vaporize at the sintering temperature and in the nitrogen atmosphere will not undergo a chemical change.

The structurization achieved by the sintering step provides a sintered nickel plaque already impregnated with cadmium oxide. Following the removal of the impregnated plaque from the sintering furnace, the cadmium oxide can be electro-chemically converted to cadmium by a conventional forming process to provide an electrode ready for battery application. Thus, it can be seen that the process of the present invention produces a fully impregnated sintered plaque type cadmium electrode which completely eliminates the multiple impregnation, washing and drying steps which conventionally attend the manufacture of such an electrode.

Certain modifications may be made in the process as described hereinebfore and still produce high quality electrodes of the type described. For example, in the formulations given hereinbefore, the cadmium oxide was present in an amount of approximately one part by weight to two parts by weight of the powdered nickel. This formulation produces an electrode having the conventional ratio of active material to inactive plaque. It has been found possible by means of the present invention to produce electrodes in which the cadmium oxide is present in the amount of about two parts by weight to one part by weight of nickel. In addition, it has been found possible to vary the amount of thermoplastic resin utilized as a temporary binder. In the example given hereinbefore, the binder was present in an amount of approximately one part by weight to 10 parts by weight of powdered nickel and cadmium oxide. In this respect, it has been found possible to utilize as little as one part by weight of thermoplastic resin to 12 parts by weight of powdered nickel and cadmium oxide.

The temperature at which the thermoplastic resin is removed by burning from the shaped mass and the sintering temperature specified hereinbefore may also be varied. Thus, a temperature range of from about 480° F. to about 580° F. has been found to be a suitable range for the removal of the thermoplastic resin and a temperature range of from about 1250° F. to about 1700° F. has been found to be a suitable range for the sintering operation described.

It should be understood that the process of the present invention may be carried out without the incorporation of a temporary thermoplastic binder to facilitate the shaping of the powdered nickel and cadmium oxide for sintering. Thus, intimately mixed cadmium oxide powder and nickel powder may be shaped by pressing in a mold to produce a shaped plaque having a structure suitable for handling during the sintering operation. In carrying out the present invention in this form, the plaque produced by pressing may be placed directly into a furnace for sintering in a nitrogen atmosphere to accomplish the final structurization. It should be understood, however, that the preferred method for carrying out the present invention, that utilizing the temporary thermoplastic resin binder, is particularly adapted for the production of electrodes characterized by their external thinness.

Having described the present invention, that which is claimed as new is:

1. A process for producing sintered plaque type cadmium electrodes comprising the steps of intimately mixing and shaping finely divided nickel and finely divided cadmium oxide, and sintering said shaped mixture in an atmosphere selected from the group consisting of nitrogen and the inert gases to structurize the nickel particles.

2. A process as specified in claim 1 wherein said cadmium oxide is present in an amount from about one-half to about two parts by weight of the nickel.

3. A process as specified in claim 2 wherein said sintering step is carried out at a temperature of from about 1250° F. to about 1700° F.

4. A process for producing sintered type cadmium electrodes comprising the steps of intimately mixing about one-half to two parts by weight of powdered cadmium oxide and one part by weight of powdered nickel, shaping said mixture, sintering said shaped mixture to structurize the nickel particles, said sintering being accomplished in a nitrogen atmosphere at a temperature range of from about 1250° F. to about 1700° F. and electrochemically converting said cadmium oxide to metallic cadmium to produce impregnated sintered type electrode.

5. A method for making a sintered type cadmium electrode which comprises the steps of intimately mixing one part by weight of a thermoplastic resin and from ten parts by weight to about twelve parts by weight of powdered nickel and cadmium oxide to produce a plasticized mass, shaping said plasticized mass, burning from said shaped mass said thermoplastic resin, and sintering the resulting structure in a nitrogen atmosphere to sinter said nickel particles to produce an electrode capable of being electrochemically active.

6. A method as specified in claim 5 wherein said thermoplastic resin is polyethylene.

7. A method as specified in claim 5 wherein said cadmium oxide is present in an amount of about one-half to two parts by weight of said nickel.

8. A method of making sintered type cadmium electrodes which comprises the steps of intimately mixing under heat and pressure, to produce a plasticized mass, one part by weight of polyethylene and from ten parts by weight to about twelve parts by weight of powdered nickel and cadmium oxide, said cadmium oxide being present in an amount from about one-half to about two parts by weight of the nickel, sheeting said plasticized mass, pressing said plasticized mass into a grid, burning from the structurization thus produced said thermoplastic resin at a temperature of from about 480° F. to about 250° F., sintering the structure produced by said last step in a nitrogen atmosphere at a temperature of from about 1250° F. to about 1750° F. to sinter the particles of nickel in the said structure, and electrochemically forming the electrode thus produced.

References Cited in the file of this patent

UNITED STATES PATENTS

| | | |
|---|---|---|
| 2,122,053 | Burkhardt | June 28, 1938 |
| 2,709,651 | Gurmick et al. | May 31, 1955 |
| 2,792,302 | Mott | May 14, 1957 |
| 2,820,077 | Salauze | Jan. 14, 1958 |
| 2,832,813 | Peters | Apr. 29, 1958 |
| 2,881,237 | Duddy | Apr. 7, 1959 |

FOREIGN PATENTS

| | | |
|---|---|---|
| 216,218 | Australia | July 28, 1958 |